(12) United States Patent
Ingram et al.

(10) Patent No.: US 8,600,630 B2
(45) Date of Patent: Dec. 3, 2013

(54) SENSING AND DISPLAY OF GEAR RATIOS

(75) Inventors: Scott Bryce Ingram, Yeronga (AU);
Craig Jeffrey Ingram, Wishart (AU);
David Meredyth Peeler, Gumdale (AU);
Anthony Morris Roe, Robertson (AU);
Bruce Richard Satchwell, Carrara (AU)

(73) Assignee: Scobyco Idea Corporation Pty Ltd, South Brisbane (AU)

( * ) Notice: Subject to any disclaimer, the term of this patent is extended or adjusted under 35 U.S.C. 154(b) by 0 days.

(21) Appl. No.: 13/455,829

(22) Filed: Apr. 25, 2012

(65) Prior Publication Data
US 2012/0277962 A1 Nov. 1, 2012

Related U.S. Application Data

(60) Provisional application No. 61/480,398, filed on Apr. 29, 2011.

(51) Int. Cl.
*G06F 7/00* (2006.01)
*B60Q 1/00* (2006.01)
*G06F 17/00* (2006.01)

(52) U.S. Cl.
USPC ............... 701/51; 340/439; 340/441; 701/53

(58) Field of Classification Search
USPC .................................... 701/51, 53
See application file for complete search history.

(56) References Cited

U.S. PATENT DOCUMENTS

| | | | | |
|---|---|---|---|---|
| 4,320,381 A | * | 3/1982 | Olivier | 340/439 |
| 6,459,368 B1 | * | 10/2002 | Miller et al. | 340/456 |
| 6,917,283 B2 | * | 7/2005 | Takeda | 340/432 |
| 7,110,869 B2 | * | 9/2006 | Tao et al. | 701/31.1 |
| 2004/0143726 A1 | * | 7/2004 | Diewald | 712/36 |
| 2009/0273459 A1 | * | 11/2009 | Crave et al. | 340/441 |

* cited by examiner

*Primary Examiner* — Thomas Black
*Assistant Examiner* — Tyler Paige
(74) *Attorney, Agent, or Firm* — Oleg A. Mestechkin; Antonio Papageorgiou (57) ABSTRACT

The present application discloses an apparatus for determining and displaying gear ratios in a transmission system having a driving sprocket set, a driven sprocket set and a flexible drive member that engages the driving sprocket set and driven sprocket set, the apparatus comprising a display, a sensing module, the sensing module comprising a plurality of magneto-resistive assemblies, wherein at least one of the plurality of magneto-resistive assemblies is configured to detect adjustment of the transmission system, the sensing module configured to generate a signal responsive to said adjustment of the transmission system, and a data processor communicatively coupled with the display and with the sensing module, the data processor configured to receive the signal generated by the sensing module, process the signal to generate data relating to sprockets engaged by the flexible drive member, and write the data to the display.

18 Claims, 5 Drawing Sheets

SENSING AND DISPLAY OF GEAR RATIOS

RELATED APPLICATIONS

The present application claims the benefit of U.S. provisional application No. 61/480,398, filed on Apr. 29, 2011 which is incorporated herein by reference.

FIELD OF THE INVENTION

This invention relates to the sensing and display of gear ratios in a variable transmission system. The invention relates more specifically to the sensing and display of gear ratios in a variable transmission system having a driving sprocket set, a driven sprocket set and a flexible drive member that engages the driving and driven sprocket sets.

BACKGROUND TO THE INVENTION

Derailleur variable transmission systems usually rely on the position of a drive chain, belt or the like relative to driving and driven gears or cogs that engage the drive chain. Usually, there are a number of driving gears of varying diameter and a number of driven gears of varying diameter. A desired gear ratio can be selected by displacing the drive chain with a suitable mechanism from one driving and/or driven gear to the other.

Bicycles predominantly use such transmission systems. In bicycles, the system can include two or more front driving gears or chainrings and usually up to eleven driven gears or sprockets. Thus, the highest gear ratio is achieved when the chain is engaged with the largest chainring and the smallest sprocket. The lowest gear ratio is achieved when the drive chain is engaged with the smallest chainring and the largest sprocket.

In competitive cycling or when there are a number of external factors that require attention, it can be difficult for a cyclist to ascertain what gear ratio is required for his or her preferred cadence. For example, the cyclist may have been cycling with a particular gear ratio for a significant duration and he or she may have forgotten the combination of chainring and sprocket that is being used. He or she could easily make an incorrect selection. For example, the next gear ratio down could require a change of chainring. Not realising this immediately could cause the cyclist loss of precious time. Also, it can be dangerous, particularly at high speed and/or in a peloton, if it becomes necessary for the cyclist to look down at the gears.

Many bicycles have front and rear derailleur transmission systems. Such bicycles are typically set so that the range of gear ratios available with the chainrings overlap with the range of gear ratios available with the sprockets. For example, if a front derailleur system has two chainrings ("high ratio" and "low ratio"), and a rear derailleur is used with 11 sprockets, then the lowest 6 gear ratios available with the high ratio chainring may be lower than the highest gear ratio available with the low ratio chainring. Such a bicycle can pose a number of problems for a cyclist:

Cyclists often do not know what sprocket or chainring is engaged at any particular time. This is particularly so in the dark or when riding tandem.

A cyclist may find that with the high ratio chainring none of the available gear ratios are suitable. There may be a more suitable gear ratio with the low ratio chainring but the cyclist must have information available to decide whether or not to change to the low ratio chainring.

It can be difficult for a cyclist to determine the best gear ratio if the speed of the cyclist changes rapidly, for example when slowing down for an obstruction.

SUMMARY OF THE INVENTION

According to at least one of the embodiments, there is an apparatus for detection and display of gear ratios in a variable transmission system having a driving sprocket set, a driven sprocket set and a flexible drive member that engages the driving sprocket set and the driven sprocket set, the apparatus comprising a display, a sensing module configured to detect adjustment of the transmission system and to generate a signal responsive to said adjustment of the transmission system, and a data processor operable with the sensing module and being configured to: receive the signal generated by the sensing module, process the signal to generate data relating to sprockets engaged by a flexible drive member, and write the data to the display that is configured to represent the sprockets of one of the driving sprocket set and the driven sprocket set as discernible representations and the sprockets of the other of the driving sprocket set and the driven sprocket set as corresponding groups of said discernible representations, the groups being positioned relative to each other so that relative positions of the discernible representations in the groups represent gear ratios that can be achieved with the transmission system, the display being further configured to indicate which one of the groups represents a sprocket, of one of the driving sprocket set and the driven sprocket set, that currently engages the flexible drive member, and which representation represents a sprocket, of the other of the driving sprocket set and the driven sprocket set, that currently engages the flexible drive member.

The display may be configured to represent the sprockets of the driven sprocket set as a row or series of representations. Each sprocket of the driving sprocket set can be represented as one row of the representations. The rows may be juxtaposed and offset linearly so that a first representation in a first row representing a largest of the driving sprockets represents the highest gear ratio that can be achieved, while a last representation of a last row representing the smallest of the driving sprockets represents the lowest gear ratio that can be achieved. It will be appreciated that there can be any number of rows between the first and last rows representing intermediate driving sprockets. Thus, the display may be configured to generate a line that extends through a representation of a currently driven sprocket so that a user can readily discern which representation will provide the next higher or lower ratio.

The transmission system may be of the type found on a bicycle. Thus, the driving sprockets are referred to as chainrings and driven sprockets are referred to as sprockets. On a bicycle the transmission system usually includes a cable connected between a front derailleur assembly and a lever mechanism (the "front cable") and a cable connected between a rear derailleur assembly and a lever mechanism (the "rear cable").

The sensing module may be configured for operative engagement with the transmission system. In particular, the sensing module may be configured to sense movement of the front and rear cables.

The sensing module may include a front magneto-resistive sensing assembly to sense movement of the front cable and a rear magneto-resistive sensing assembly to sense movement of the rear cable.

Each sensing assembly may include a magnet mounted on an exposed portion of the associated cable. For example, many bicycles have cable stops mounted on one of the frame tubes, such as the down tube. A gear cable housing extends from one side of each cable stop to the associated lever. Exposed cable extends from the other side of the cable stop to the associated derailleur assembly.

The magnets may be slotted cylindrical magnets mounted on each cable with the cable extending through a slot in the magnet. North and South poles of the magnets may lie along an axis parallel or co-linear with the respective cables.

A printed circuit board (PCB) may be mounted on the frame tube proximate the magnets. Magneto-resistive sensors may be mounted on the PCB to sense the magnets and their respective movements. The sensors may thus be connected to the data processor to communicate signals generated as a result of movement of the magnets to the data processor.

The data processor may be mounted on the PCB in one embodiment. The data processor could also be mounted in the display or partially on the PCB and in the display.

The data processor may include a memory. The data processor may be configured to generate a data table within the memory and to store sensor outputs as they relate to movement of the cables with respect to the sprockets or chainrings selected for engagement with the flexible drive member.

According to another embodiment, there is a display device for use with an apparatus for sensing and display of gear ratios in a variable transmission system having a driving sprocket set, a driven sprocket set and a flexible drive member that engages the driving sprocket set and the driven sprocket set, the display device comprising a display and a data processor operable with a sensing module that is capable of generating a signal responsive to adjustment of the transmission, the data processor being configured to: receive the signal generated by the sensing module, process the signal to generate data relating to sprockets engaged by a flexible drive member, and write the data to the display so that the display represents the sprockets of one of the driving sprocket set and the driven sprocket set as discernible representations and the sprockets of the other of the driving sprocket set and the driven sprocket set as corresponding groups of said discernible representations, the groups being positioned relative to each other so that relative positions of the discernible representations in the groups represent gear ratios that can be achieved with the transmission system, and so that the display indicates which one of the groups represents a sprocket, of one of the driving sprocket set and the driven sprocket set, that currently engages the flexible drive member and which representation represents a sprocket, of the other of the driving sprocket set and the driven sprocket set, that currently engages the flexible drive member.

According to yet another embodiment, there is a method of determining and displaying gear ratios in a transmission assembly having a driven sprocket set and a driving sprocket set engaged by a flexible drive member, the method including the steps of: detecting adjustment of the transmission assembly and generating a signal responsive to said adjustment, receiving, at a data processor, said signal, processing the signal to generate data relating to sprockets engaged by a flexible drive member, and writing the data to a display such that the sprockets of one of the driving sprocket set and the driven sprocket set are displayed as discernible representations and the sprockets of the other of the driving sprocket set and the driven sprocket set as corresponding groups of said discernible representations, the groups being positioned relative to each other so that relative positions of the discernible representations in the groups represent gear ratios that can be achieved with the transmission system, and such that the display indicates which one of the groups represents a sprocket, of one of the driving sprocket set and the driven sprocket set, that currently engages the flexible drive member and which representation represents a sprocket, of the other of the driving sprocket set and the driven sprocket set, that currently engages the flexible drive member.

The step of processing the signal may include the step of comparing, at the data processor, said data relating to said signal with previously stored data relating to previously selected sprockets and displaying information relating to presently selected sprockets.

The step of sensing adjustment of the transmission assembly may include the step of sensing an extent of movement of a connector located between a lever and a gear change mechanism of the transmission assembly.

The invention is now described by way of example, with reference to the drawings. The following description is illustrative only and is not intended to narrow the scope of the preceding paragraphs.

DETAILED DESCRIPTION OF THE DRAWINGS

Figure 1:
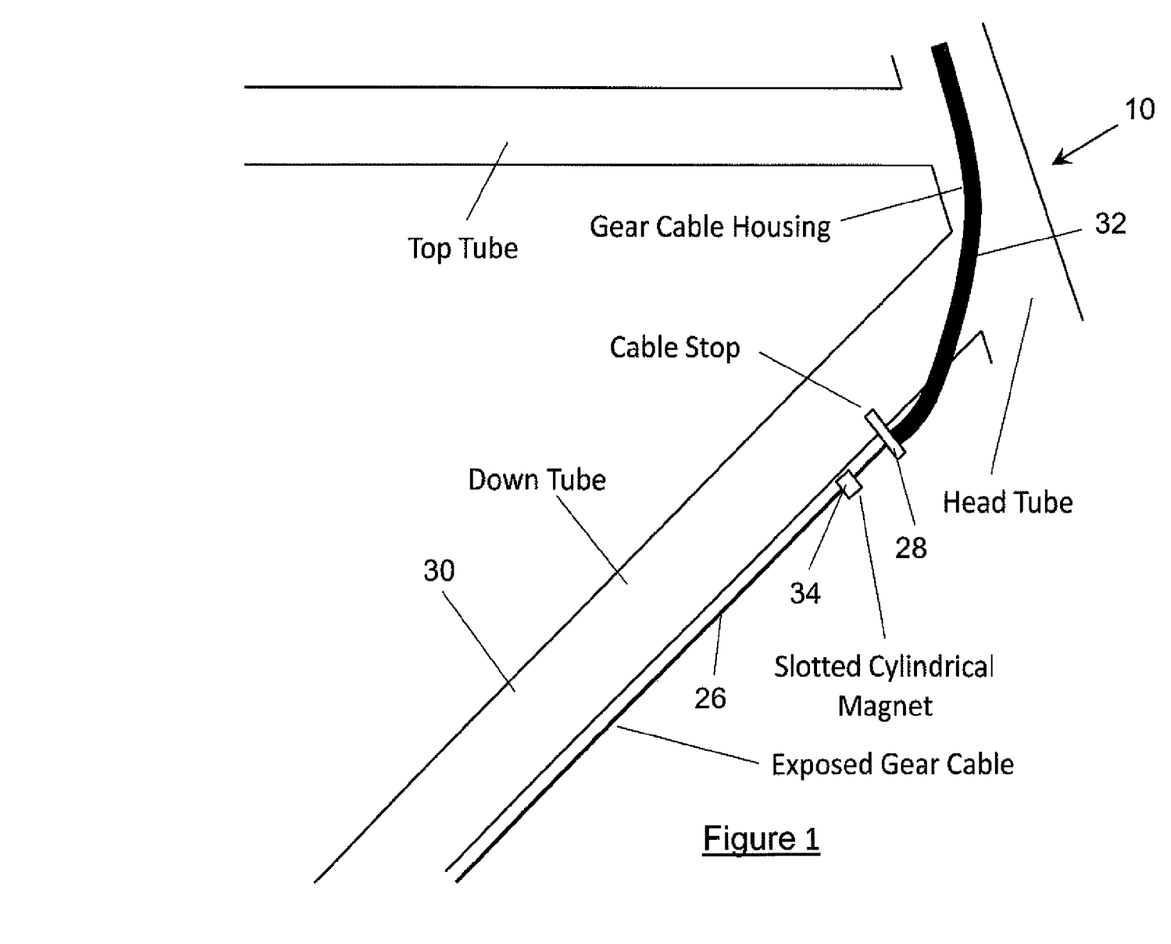
FIG. 1 shows a part of a bicycle frame carrying an apparatus, in accordance with the invention, for the sensing and display of gear ratios in a variable transmission system having a driving sprocket set, a driven sprocket set and a flexible drive member engaged with both the driven and driving sprocket sets.

FIG. 1 shows a bicycle frame 10 on which part of an apparatus, in accordance with the invention, is mounted. The apparatus is suitable for the sensing and display of gear ratios in a derailleur variable transmission system having a driving sprocket set and a driven sprocket set. However, it is to be appreciated that the apparatus is also suitable for the sensing and display of the gear ratios in some other form of transmission system that uses sprocket sets and a flexible drive member that engages the sprockets. Furthermore, the sprockets can be of a number of different types, for example such as those that are configured to engage a belt. The constraining requirement is that the selection of sprockets engaged by the flexible drive member determines the gear ratio achieved by the transmission. Thus, the term "sprocket" should be understood to be any circular drive or driven member configured to engage a flexible drive member.

As shown in FIG. 1, on a bicycle the transmission system usually includes a cable connected between a front derailleur assembly and a lever mechanism (the "front cable 24") and a cable connected between a rear derailleur assembly and a lever mechanism (the "rear cable 26"). The sensing module 16 is configured to sense movement of the front and rear cables 24, 26.

This particular example relates to the apparatus being used with a bicycle. It will readily be appreciated that the apparatus could find application to a number of other forms of variable transmission. Thus, in the following description, "flexible drive member" is replaced by "chain", which is the common form of drive member used with bicycles. However, it will be understood that the apparatus can be used with those bicycles that have belts or some other form of flexible drive member.

Figure 2:
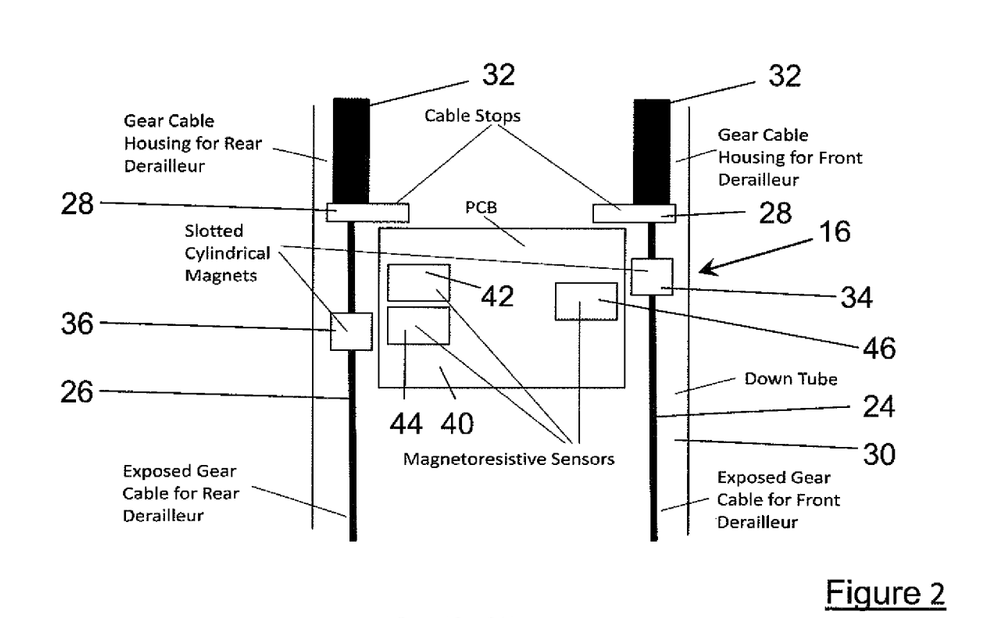
FIG. 2 shows a sensing module of the apparatus mounted on the bicycle frame.

FIG. 2 presents the apparatus which includes a sensing module 16 operable with the transmission system and configured to generate a signal responsive to adjustment of the transmission. In the preferred embodiment, the sensing module 16 includes a front magneto-resistive sensing assembly to sense movement of the front cable 24 and a rear magneto-resistive sensing assembly to sense movement of the rear cable 26.

Further, FIG. 2 displays a printed circuit board (PCB) 40 mounted on the down tube 30 proximate the magnets 34, 36. A pair of magneto-resistive sensors 42, 44 is mounted on the PCB to sense the movement of the magnet 36 and one magneto-resistive sensor 46 is mounted on the PCB to sense the movement of the magnet 34. The sensors are connected to the data processor 18 to communicate signals generated as a result of movement of the magnets 34, 36 to the data processor 18.

Each sensing assembly includes a magnet 34 mounted on an exposed portion of the associated front cable 24 and a magnet 36 mounted on an exposed portion of the associated rear cable 26. In this example, the bicycle has cable stops 28 mounted on the down tube 30. A gear cable housing 32 extends from one side of each cable stop 28 to the associated lever. Exposed cable extends from the other side of the cable stop 28 to the associated derailleur assembly.

The magnets are attached to the cables using a hot glue gun or some other form of adhesive. Other methods of attachment such as a grub screw or clip are also possible.

Figure 3:
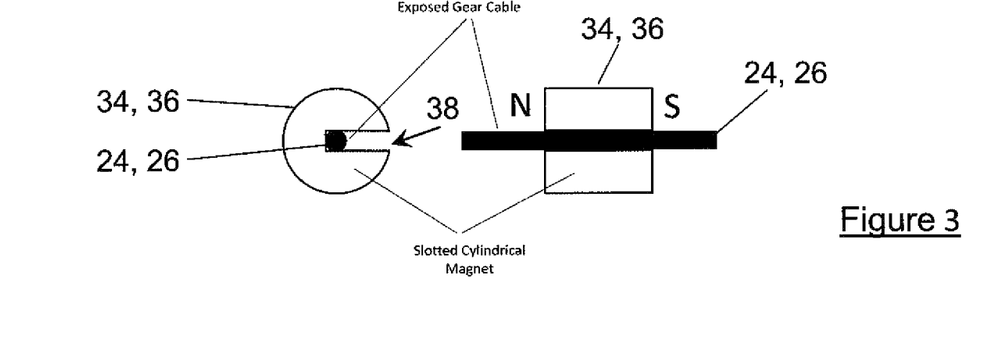
FIG. 3 shows a magnet of the sensing module mounted on a cable of the transmission system.

FIG. 3 indicates that the magnets 34 and 36 are slotted cylindrical magnets mounted on each cable 24, 26 with the cable extending through a slot 38 in the magnet. North and South poles of the magnets may lie along an axis parallel or co-linear with the respective cables 24, 26. Thus, the magnets can move together with the cables 24, 26, when gear changes are made. An example of a suitable magnet is a 0.25" diameter×0.25" thick NdFeB magnet from Radial Magnet Inc. The magnets are attached as close as possible to the end of the exposed portion or section of cable to minimize any inaccuracy introduced by vibration of the cable when the bicycle is moving.

Figures 4, 5:
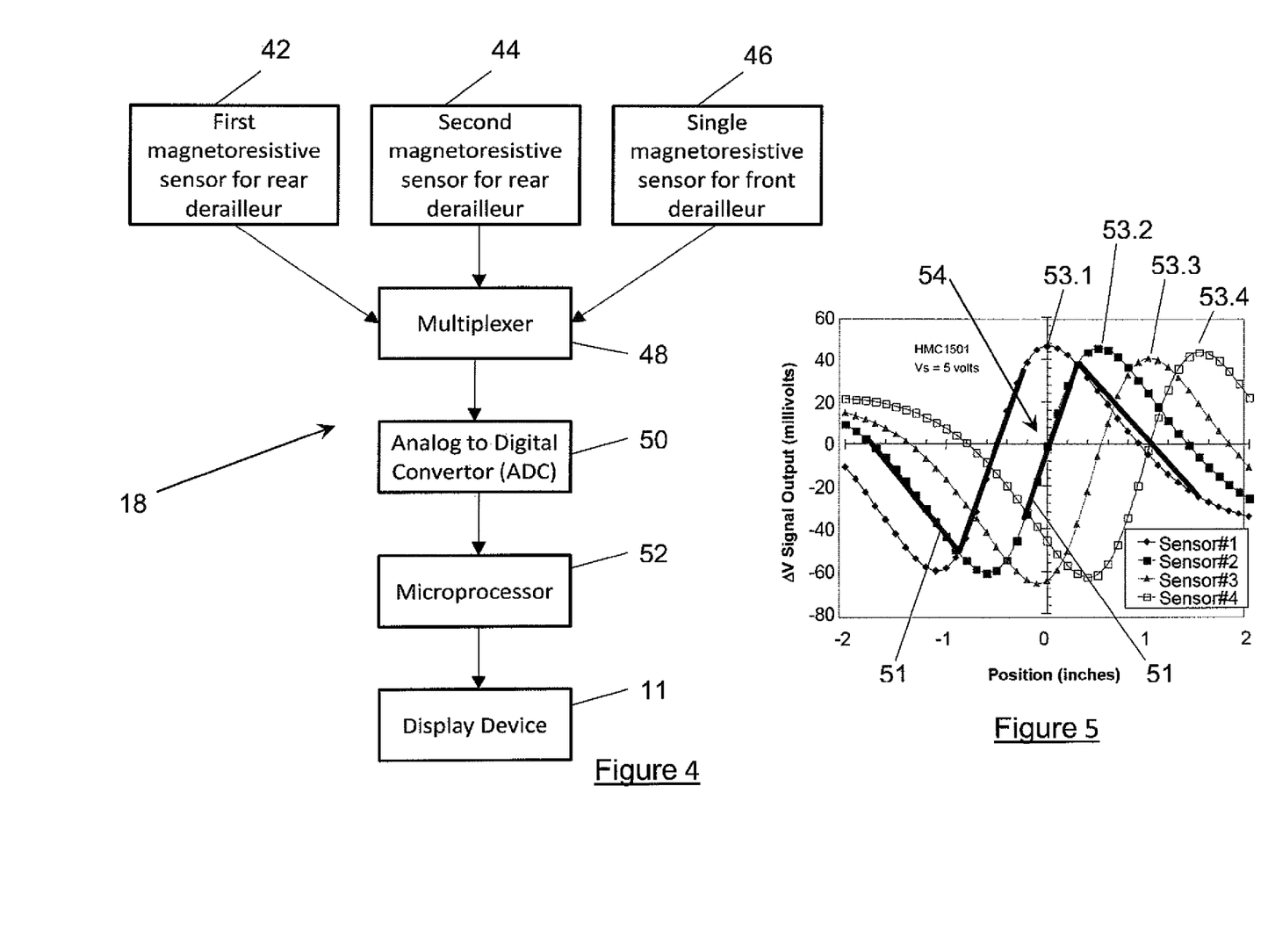
FIG. 4 shows a data flow diagram illustrating the flow of data from the sensing module to a display device of the apparatus.
FIG. 5 shows an output graph representing the characteristics of a sensing module of the apparatus.

FIG. 4 shows the apparatus which includes a display device 11 and a data processor 18 operable with the sensing module 16 and is configured to receive the signal generated by the sensing module 16 to process the signal to generate data relating to sprockets engaged by the chain and to write the data to the display device 11. The data processor includes a memory. The data processor is configured to generate a data table within the memory and to store sensor outputs as they relate to movement of the cables with respect to the sprockets selected for engagement with the chain.

A data flow diagram, shown in FIG. 4, sets out the manner in which the sensing module 16 interacts with the data processor 18. The data processor 18 includes a multiplexer 48 that receives analog signals from the front sensor 46 and the pair of rear sensors 42, 44. The data processor 18 includes an analog to digital converter (ADC) 50 to receive signals from the multiplexer 48 and a microprocessor 52 to receive signals from the ADC 50. The microprocessor 52 is connected to the display device 11 so that the display device 11 can generate the display 12, 14.

The data processor 18 can be mounted on the PCB 40 in one embodiment. The data processor 18 could also be mounted in the display or partially on the PCB and in the display.

The sensors 42, 44 and 46 are selected to have the characteristics of signal output to position as shown in the graph of FIG. 5. In that graph, output curves 53.1 to 53.4 indicate the use of four sensors to determine the extent of movement of the rear cable 26. In this example, the sensors are those supplied by Honeywell, with a model number of HMC1501. Usually, measurements are taken from a central range 54 of each of the curves, necessitating the use of the four sensors.

In this embodiment, however, the lines 51 on the graph indicate the extent of the output curves 53.1 and 53.2 used by the sensors 42, 44 to determine the extent of movement of the rear cable 26. By using a significantly greater extent of the respective output curves 53.1 and 53.2, it is possible to use just the two sensors 42, 44 as opposed to four sensors.

Figure 6:
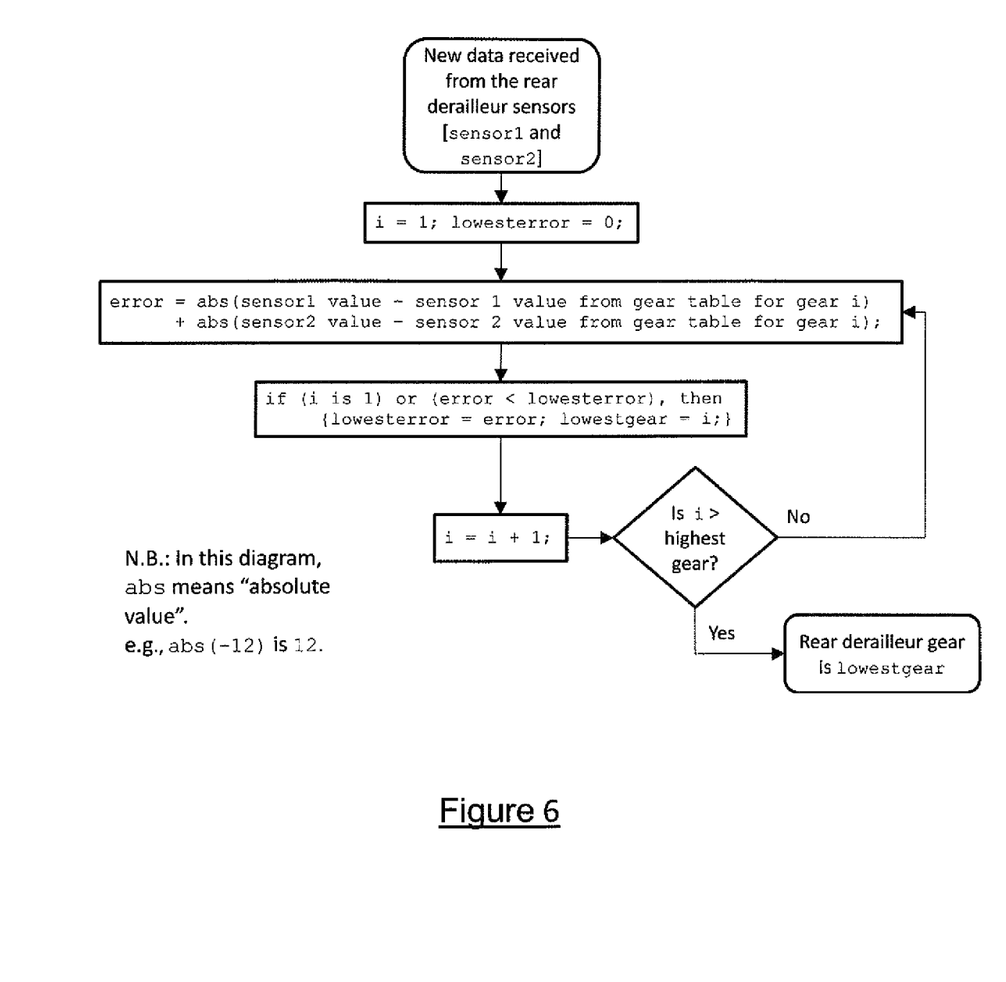
FIG. 6 shows a flowchart illustrating the algorithm in accordance with which the data processor determines a selected sprocket.

FIG. 6 displays the code segment an example of how the sprockets are associated with sensor outputs:

```
lowestindex = 0;
lowesterror = abs(geartab[0][0] − sensor1) + abs(geartab[1][0] − sensor2);
for (i=1; i < GEARS; i++)
{
    error = abs(geartab[0][i] − sensor1) + abs(geartab[1][i] − sensor2);
    if (error < lowesterror)
    {
        lowesterror = error;
        lowestindex = i;
    }
}
gear = lowestindex + 1;
```

Figure 7:
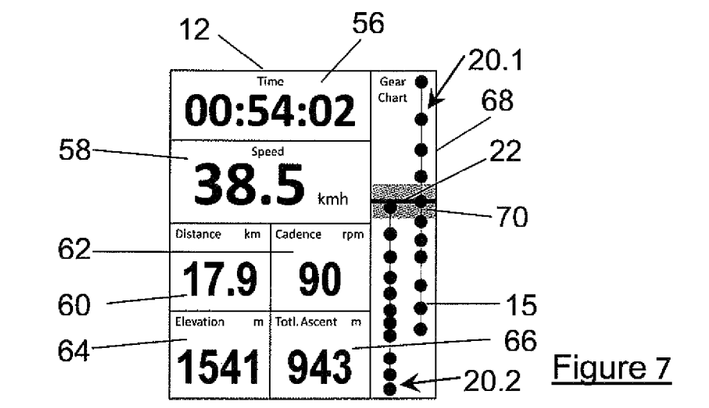
FIG. 7 shows a gear chart generated by a display of the apparatus.

In FIG. 7, the display device 11 is configured to generate the displays 12, 14 showing discernible representations 15 representing the sprockets of one of the driving sprocket set and the driven sprocket set and the sprockets of the other of the driving sprocket set and the driven sprocket set as corresponding groups of said discernible representations 15. The groups are positioned relative to each other so that relative positions of the discernible representations 15 in the groups represent gear ratios that can be achieved with the transmission system. The display device 11 is further configured to indicate which one of the groups represents a sprocket that currently engages the chain. In this example, the discernible representations are in the form of dots. However, any other form of discernible representation could be used.

Further, in FIG. 7, number 12 indicates one example of a display generated by the display device 11.

Also, as shown in FIG. 7, the display device 11 is configured to represent the sprockets of the driven sprocket set as a row or series 20 of dots to form the respective groups. Each sprocket or chainring of the chainring set can be represented as one row 20 of the dots. The rows 20 are juxtaposed and offset linearly so that a first dot in a row 20.1 representing a larger of the chainrings represents the highest gear ratio that can be achieved, while a last dot of a last row 20.2 representing a smaller of the chainrings represents the lowest gear ratio that can be achieved.

The example provided in FIG. 7 shows two chainrings. However, it will be appreciated that there can be any number of rows between the first and last rows representing intermediate chainrings. The display device 11 is configured to generate a line 22 that extends through a dot 15 representing a current sprocket, the dot 15 being in the row 20 of a current chainring so that a user can readily discern which dot will provide the next higher or lower ratio and whether or not it will be necessary to shift chainrings in order to achieve the next higher or lower ratio.

The data processor 18 is configured so that the display 12 generated by the display device 11, as presented in FIG. 7, shows the time at 56, the current speed at 58, the distance travelled at 60, the cadence at 62, the elevation at 64 and the total height ascended at 66. It will thus be appreciated that the device 11 can form part of existing bicycle equipment that includes a speedometer, a tachometer and an altimeter.

The data processor 18 is also configured so that the display 12 generated by the display device 11 shows a gear chart at 68. The gear chart 68 contains the rows 20 of the dots 15 representing the sprockets selected by the cyclist. In particular, the right hand row 20.1 represents the larger or high ratio chainring while the left hand row 20.2 represents the smaller or low ratio chainring. Within the rows 20, each of the dots 15 represent a sprocket that can be selected while using the associated chainring. In this example, the line 22 passes through the fifth dot from the top of the row 20.1. This means that the high ratio chainring and the fifth smallest sprocket are engaged. Thus, to move to the next lower ratio, the low ratio chainring should be engaged together with the smallest sprocket.

In this example, the data processor 18 can be configured to permit a user to enter a preferred cadence range. That cadence range is represented by a bar 70 that extends across the rows 20. The data processor 18 is configured to position the bar 70 across the dots 15 that represent sprockets matching the cadence range at a current speed. This can help the cyclist make the correct gear change.

Instead, or in addition, the display device 11 can be configured to alter the shape or colour of the dot representing the currently engaged sprocket.

The transmission system is of the type found on a bicycle. Thus, the driving sprockets are referred to as chainrings and the driven sprockets are referred to as sprockets.

There are a number of options available for determining the extent of movement of the cables 24, 26 using the sensors 42, 44 and 46.

One option to determine the extent of movement of the cables 24, 26 using the sensors 42, 44 and 46 is to measure displacement. The sensor with its output closest to zero is regarded as "active". Each sensor has two possible "active" ranges. Which range is active can be determined from whether the output of the other sensor is greater than or less than the output of the "active" sensor. Once the displacement is determined, this can be matched to a gear. This approach can be improved by averaging the results from both sensors in zones where the "active" sensor is close to being switched.

Another option to determine the extent of movement of the cables 24, 26 using the sensors 42, 44 and 46 is to maintain a table within the microprocessor 52 which records the sensor outputs for each sprocket or chainring selected. The sprocket or chainring is identified from the best match to the sensor outputs.

It will be appreciated that once the apparatus is installed, it will be necessary to configure the apparatus before use. The cyclist is requested to ride the bicycle, starting in the lowest ratio and working through the gears sequentially, spending some time in each gear, allowing the microprocessor to build the table mentioned above. The microprocessor 52 is configured to capture the data and to use it for one of the options described above.

Figure 8A:
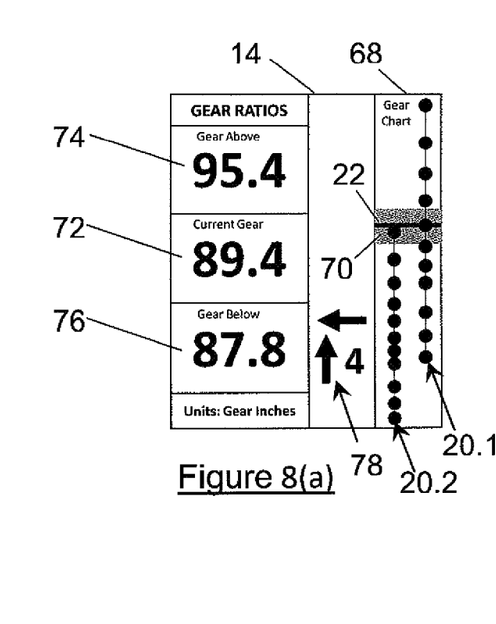
FIGS. 8(a) to 8(c) show a number of different gear charts generated by the display of the apparatus.
Figure 8B:
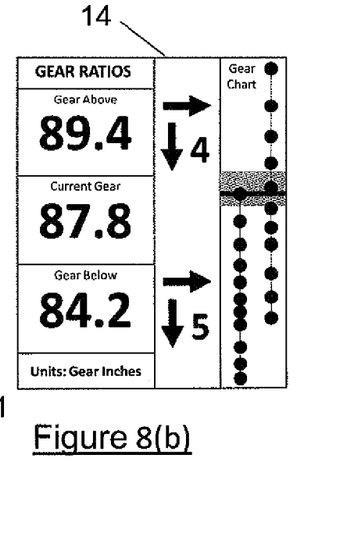
Figure 8C:
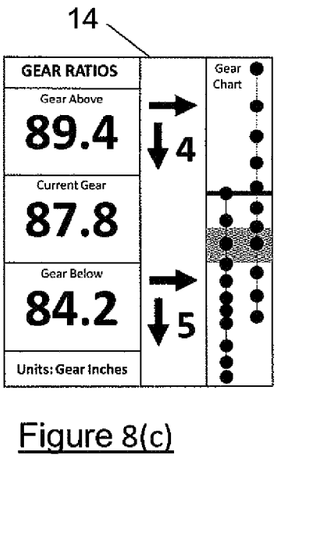

As shown in FIGS. 8(a) to (c), the data processor 18 can also be configured to generate the display 14. In addition to the gear chart 68, the data processor 18 is configured to generate a current gear ratio at 72, an upper gear ratio at 74 and a lower gear ratio at 76. The data processor 18 is also configured to generate gear change indicators 78 in association with the upper and lower gear ratios 74, 76 to indicate to a cyclist the manner in which the chain should be shifted to achieve the associated gear ratio. This is achieved by an arrow perpendicular to the rows 20 to indicate a change from one chainring to the other and an arrow parallel to the rows 20 together with a number to indicate the number of sprocket shifts required in a particular direction. Where there are three or more chainrings, then multiple arrows could be used to show if multiple changes are required.

Said display 14 indicates another example of a display generated by the display device 11. The display device 11 can itself include a conventional display module, such as that used on a bicycle computer. In one example, the display device 11 is incorporated into a bicycle computer to enhance the information capable of being shown by the bicycle computer.

For example, in FIG. 8(a) the indicated lower ratio at 76 can be achieved by shifting from the high ratio chainring to the low ratio chainring and to the smallest sprocket. In FIG. 8(b) the indicated lower ratio 76 can be achieved by shifting to the high ratio chainring and to the sixth smallest sprocket. The indicated higher ratio at 74 can be achieved by shifting to the high ratio chainring and to the fifth smallest sprocket.

In FIG. 8(c) it can be seen that a shift to the third smallest sprocket will place the cyclist in the preferred cadence range. Alternatively, the cyclist can shift to the high ratio chainring and to the fourth largest sprocket.

It is to be appreciated that a number of different types of sensing modules can be used together with the invention. For example, the sensing module could be a system that compares a cyclist's cadence with the speed of the bicycle to determine a current gear ratio. In another example, the sensing module could be a camera-based system for optical sensing of a gear change or chain position. The term should be understood as also covering a module for sensing a gear ratio and/or change in gear in transmission systems without cables. It follows that the term "sensing module" should be given a broad meaning in the specification in the sense that it encompasses any module that is capable of determining or otherwise ascertaining a current gear ratio and/or a change in gear ratio.

Reference to bicycle computers has been non-specific. Specific examples which could be used with the apparatus of the invention are standard commercial computers such as those made by Garmin, mobile or cellular telephones, Personal Digital Assistants (PDA's) and custom made display devices.

Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any subject matter in the Summary unless otherwise stated. No language in the specification should be construed as indicating any subject matter not in the Summary as essential.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and Any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Throughout the specification, including the claims, where the context permits, the term "comprising" and variants thereof such as "comprise" or "comprises" are to be interpreted as including the stated integer or integers without necessarily excluding any other integers.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

The invention claimed is:

1. An apparatus for determining and displaying gear ratios in a transmission system having a driving sprocket set, a driven sprocket set and a flexible drive member that engages the driving sprocket set and driven sprocket set, the apparatus comprising:
   a display;
   a sensing module, the sensing module comprising a plurality of magneto-resistive assemblies each comprising at least one magnetoresistive sensor and a magnet attached to a derailleur adjustment mechanism of the transmission system, wherein at least one of the plurality of magneto-resistive assemblies is configured to detect adjustment of the transmission system based on movement of the magnet relative to the at least one magnetoresistive sensor, the sensing module configured to generate a signal responsive to said adjustment of the transmission system; and
   a data processor communicatively coupled with the display and with the sensing module, the data processor configured to:
      receive the signal generated by the sensing module;
      process the signal to generate data relating to sprockets engaged by the flexible drive member; and
      write the data to the display.

2. The apparatus of claim 1, wherein the display is configured to indicate, based on the signal responsive to said adjustment, a sprocket of one of the driving sprocket set and the driven sprocket set, that currently engages the flexible drive member, and a sprocket of the other of the driving sprocket set and the driven sprocket set, that currently engages the flexible drive member.

3. The apparatus of claim 1, wherein each of the driving and driven sprocket sets comprises a plurality of sprockets, the display is configured to represent each of the plurality of the sprockets of the driving sprocket set and the driven sprocket set as at least one discernible representation in a number of groups of discernible representations equal to the number of driving sprockets.

4. The apparatus of claim 3, wherein the combination of driving sprockets and the driven sprockets provide a plurality of overlapping gear ratios, the plurality of groups comprising a first group representing a first driven sprocket and a second group representing a second driven sprocket, each of the groups comprising at least one discernible representation for each of the driven sprockets, wherein the groups are positioned relative to each other so that the relative positions of the plurality of discernible representations in the first and the second groups are arranged based on gear ratio to represent gear ratios, including overlapping and non-overlapping combinations of sprockets, that can be achieved with the transmission system.

5. The apparatus of claim 4, wherein the first and second groups of discernible representations are each displayed in a row of discernible representations, the plurality of rows being juxtaposed and offset linearly so as to show overlapping combinations of sprockets adjacent to each other in the rows.

6. The apparatus of claim 1, wherein the data processor is further configured to generate and store data comprising a plurality of sensor outputs related to the detected adjustment of the transmission system, the stored data indicative of at least one sprocket selected for engagement with the flexible drive member based on previously identified match of the plurality of sensor outputs.

7. The apparatus of claim 1, wherein the act of processing of the signal comprises comparing data related to the signal with previously stored data being relative to previously selected sprockets.

8. The apparatus of claim 1, wherein the derailleur adjustment mechanism comprises a derailleur cable and wherein detecting adjustment of the transmission system comprises detecting an extent of movement of the derailleur cable of the transmission system.

9. The apparatus of claim 1, wherein the display is at least one of: a bicycle computer, a portable GPS device; a mobile communication device; a personal digital assistant; and custom made display device.

10. An apparatus for determining and displaying gear ratios in a transmission system having a driving sprocket set, a driven sprocket set and a flexible drive member that engages the driving and the driven sprocket sets, the apparatus comprising:
    a display;
    a sensing module, the sensing module configured to generate a signal in response to detecting adjustment of the transmission system; and
    a data processor communicatively coupled with the display and with the sensing module, the data processor configured to:
       receive the signal generated by the sensing module;
       process the signal to generate data relating to sprockets engaged by a flexible drive member, wherein each of the driving and driven sprocket sets comprises a plurality of sprockets and the combination of driving sprockets and the driven sprockets provide a plurality of overlapping gear ratios; and write the data to the display, the display configured to represent the sprockets of the driving sprocket set and the driven sprocket set as discernible representations in a number of groups of discernible representations equal to the number of driving sprockets, the groups comprising a first group representing a first driven sprocket and a second group representing a second driven sprocket, each of the groups comprising at least one discernible representation for each of the driven sprockets, the groups being positioned relative to each other so that relative positions of the discernible representations in the first and the second groups are arranged based on gear ratio, to represent gear ratios, including overlapping and non-overlapping combinations of sprockets, that can be achieved with the transmission system.

11. The apparatus of claim 10, wherein the sensing module comprises a plurality of magneto-resistive assemblies, wherein at least one of the plurality of magneto-resistive assemblies is configured to detect adjustment of the transmission system, the sensing module configured to generate a signal responsive to said adjustment of the transmission system.

12. The apparatus of claim 10, wherein the act of processing of the signal comprises comparing data related to the signal with previously stored data being relative to previously selected sprockets.

13. The apparatus of claim 10, wherein detecting the adjustment comprises detecting an extent of movement of at least one connector located between at least one lever and at least one gear change mechanism of the transmission system.

14. A method of determining and displaying gear ratios in a transmission assembly having a driven sprocket set and a driving sprocket set engaged by a flexible drive member, the method comprising:

receiving, by a data processor, from a sensing module comprising a plurality of magneto-resistive assemblies each comprising at least one magnetoresistive sensor and a magnet attached to a derailleur adjustment mechanism of the transmission system, a signal indicative of an adjustment of the transmission system based on movement of the magnet relative to the at least one magnetoresistive sensor;

processing, by the data processor, the signal to generate data indicative of sprockets engaged by a flexible drive member; and writing, by the data processor, the data to a display.

15. The method of claim 14, wherein writing the data to the display comprises presenting the sprockets of one of the driving sprocket set and the driven sprocket set as discernible representations and the sprockets of the other of the driving sprocket set and the driven sprocket set as corresponding groups of said discernible representations, the groups being positioned relative to each other so that relative positions of the discernible representations in the groups represent gear ratios that can be achieved with the transmission system, and such that the display indicates which one of the groups represents a sprocket, of one of the driving sprocket set and the driven sprocket set, that currently engages the flexible drive member and which representation represents a sprocket, of the other of the driving sprocket set and the driven sprocket set, that currently engages the flexible drive member.

16. The method of claim 14, wherein the data processor is further configured to generate and store data comprising a plurality of sensor outputs related to the detected adjustment of the transmission system, the detected adjustment being relative to sprockets selected for engagement with the flexible drive member.

17. The method of claim 14, wherein the act of processing of the signal comprises comparing data related to the signal with previously stored data being relative to previously selected sprockets.

18. The method of claim 14, wherein detecting the adjustment of the transmission system comprises detecting an extent of movement of at least one connector located between at least one lever and at least one gear change mechanism of the transmission system.

* * * * *